Nov. 1, 1927.
C. PALLENBERG
1,647,247
RESILIENT SEAT MOUNT
Filed Dec. 23, 1926
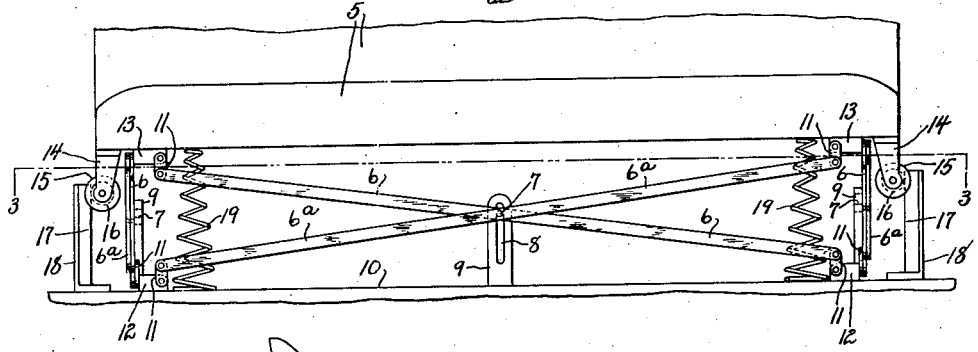
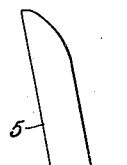
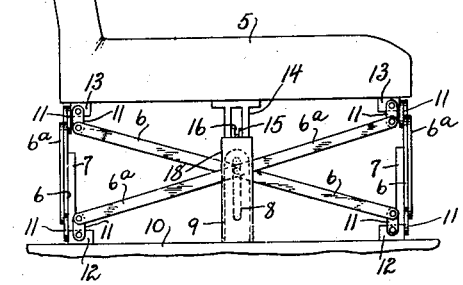
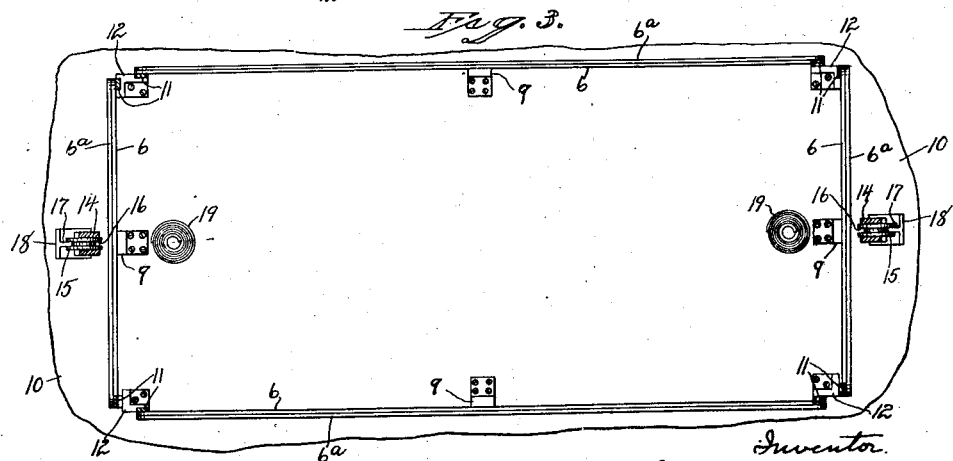

Patented Nov. 1, 1927.

1,647,247

UNITED STATES PATENT OFFICE.

CHRISTIAN PALLENBERG, OF CLINTON, CONNECTICUT, ASSIGNOR OF ONE-HALF TO EMIL PALLENBERG, OF CLINTON, CONNECTICUT.

RESILIENT SEAT MOUNT.

Application filed December 23, 1926. Serial No. 156,575.

This invention relates to an improvement in resilient seat-mounts which are particularly adapted for use in automobiles, but also useful in other situations where a shock-absorbing seat is desirable. The object of this invention is to produce a simple and rugged, resilient seat-mount constructed with particular reference to the prevention of lateral play.

With this object in view, my invention consists in a resilient seat-mount characterized by a pair of crossed equalizer-bars supporting each of the four sides of the seat and independent guides for preventing the lateral displacement thereof.

In the accompanying drawings:

Fig. 1 is a broken view in front elevation of a seat equipped with my improved resilient mount;

Fig. 2 is an edge view thereof; and

Fig. 3 is a view in horizontal section on the line 3—3 of Fig. 1.

In carrying out my invention, as herein shown, I mount adjacent each of the four edges of the seat 5 a pair of crossed equalizer-bars 6 and 6ª which are pivoted together midway between their ends by a stud 7 which is shouldered and extends into a guide-slot 8 in a vertical bracket 9 upstanding from the supporting-surface 10 which may be the floor of an automobile, or other suitable support. Each of the equalizer-bars 6 and 6ª is provided at its opposite ends respectively with short links 11, one of which is pivoted to a floor-bracket 12 and the other, at the opposite end, being connected to a seat-bracket 13 secured to the underface of the seat-structure, which is yieldingly supported by two springs 19. By means of the parts just described, the seat is maintained in parallel relation with reference to the supporting-surface 10, regardless of the distribution of weight upon the seat itself.

To prevent the appreciable edgewise movement of the seat in any direction, I mount upon each of the opposite ends of the underface of the seat 5 a depending bracket 14 carrying a guide-roller 15 formed with a deep groove 16 for the reception of the leg 17 of a T-shaped guide-bracket 18 upstanding from the supporting-surface 10. By the entry of the leg 17 of the bracket 18 into the groove 16 of the guide-roller 15, the sidewalls of the said groove co-act with it to prevent the displacement of the seat from front to rear or vice versa, while the bases of the grooves of the respective, oppositely-located rollers co-act with the inner face of the legs 17 to prevent side-wise movement in either direction.

I claim:

1. In a resilient seat-mount, the combination with a seat and a support therefor; of an independently-organized pair of crossed equalizer-bars located adjacent to and parallel with each of the four edges of the said seat; means for connecting one end of each of the said equalizer-bars to the said seat and its opposite end to the said support; a central pivot connecting the respective bars of each pair together; a vertical guide for each pivot; and means independent of the said equalizer-bars for guiding the said seat in a vertical path; whereby the said seat is prevented from lateral displacement and each pair of equalizer-bars is restrained from endwise movement.

2. In a resilient seat-mount, the combination with a seat and a support therefor; of an independently-organized pair of crossed equalizer-bars located adjacent to and parallel with each of the four edges of the said seat; links for connecting one end of each bar to the said seat and its opposite end to the said support; a central pivot connecting the respective bars of each pair together; a vertical guide for each pivot; and means independent of the said equalizer-bars for guiding the said seat in a vertical path; whereby the said seat is prevented from lateral displacement and each pair of equalizer-bars is restrained from endwise movement.

In testimony whereof, I have signed this specification.

CHRISTIAN PALLENBERG.